(12) United States Patent
Love et al.

(10) Patent No.: US 8,279,811 B2
(45) Date of Patent: Oct. 2, 2012

(54) ALLOCATING DOWNLINK ACKNOWLEDGEMENT RESOURCES IN WIRELESS COMMUNICATION NETWORKS

(75) Inventors: Robert T. Love, Barrington, IL (US); Ravi Kuchibhotla, Gurnee, IL (US); Vijay Nangia, Algonquin, IL (US); Rapeepat Ratasuk, Hoffman Estates, IL (US); Kenneth A. Stewart, Grayslake, IL (US)

(73) Assignee: Motorola Mobility LLC, Libertyville, IL (US)

( * ) Notice: Subject to any disclaimer, the term of this patent is extended or adjusted under 35 U.S.C. 154(b) by 1157 days.

(21) Appl. No.: 11/929,452

(22) Filed: Oct. 30, 2007

(65) Prior Publication Data

US 2009/0109906 A1    Apr. 30, 2009

(51) Int. Cl.
*H04W 4/00* (2009.01)
(52) U.S. Cl. ...................................... 370/329; 370/395.4
(58) Field of Classification Search .................. 370/329, 370/395.4
See application file for complete search history.

(56) References Cited

U.S. PATENT DOCUMENTS

| 2007/0047502 | A1 | 3/2007 | Marinier et al. | |
| 2007/0097981 | A1* | 5/2007 | Papasakellariou | 370/394 |
| 2008/0051125 | A1* | 2/2008 | Muharemovic et al. | 455/519 |
| 2008/0205348 | A1* | 8/2008 | Malladi | 370/335 |
| 2009/0103482 | A1* | 4/2009 | Imamura et al. | 370/329 |

FOREIGN PATENT DOCUMENTS

| EP | 1569403 A2 | 8/2005 |
| WO | 2004073200 A1 | 8/2004 |

OTHER PUBLICATIONS

3GPP TSG RAN1 #50bis; R1-074002; Motorola; "PHICH Assignment for MU-MIMO in E-UTRA"; Oct. 8-12, 2007.
3GPP TSG RAN1 #50; R1-073409; Motorola; "MU-MIMO PHICH Assignment for Adapative and Non-Adapative HARQ"; Aug. 20-24, 2007.
3GPP TSG RAN WG1 Meeting #48bis; R1-071656; MTT DoCoMo, Fujitsu, KDDI, Toshiba Corporation; "ACK/NACK Signal Structure in E-UTRA Downlink"; Mar. 26-30, 2007.
3GPP TSG RAN1 #48bis; R1-071431; Motorola; "ACK/NACK Indication for SIMO and MU-MIMO"; Mar. 26-30, 2007.
3GPP TSG RAN1 #49; R1-072166; Motorola; "Downlink Acknowledgment Channel"; May 7-11, 2007.
3GPP TSG RAN WG1#49-bis; R1-072882; LG Electronics; "DL ACK/NACK Mapping Relations"; Jun. 25-29, 2007.
U.S. Appl. No. 11/839,405; Confirmation No. 8465; Aug. 15, 2007.
U.S. Appl. No. 60/956,334; Confirmation No. 9775; Aug. 16, 2007.
Korean Intellectual Property Office, "Non-Final Rejection" for Application No. 10-2010-7011837 Aug. 16, 2011, 2 pages.
Chu Rui Chang et al, "PN Offset Planning Strategies for Non-Uniform CDMA Networks," Vehicular Technology Conference, 1997 IEEE 47th, pp. 1543-1547, May 1997.

* cited by examiner

*Primary Examiner* — Sai-Ming Chan
(74) *Attorney, Agent, or Firm* — Roland K. Bowler, II

(57) ABSTRACT

A wireless communication system includes a scheduling entity that transmits scheduling messages to first and second wireless terminals having different scheduling characteristics, wherein each scheduling message includes a reference signal cyclic shift indicator and a resource assignment. The assignment of a downlink feedback resource to the first wireless terminal is indicated by the reference signal cyclic shift indicator in the corresponding scheduling message, and the assignment of a downlink feedback resource to the second wireless terminal is indicated by a corresponding resource assignment. The scheduling entity indicates a cyclic shift that the first wireless terminal should use for its reference signal transmission using the reference signal cyclic shift indicator.

18 Claims, 3 Drawing Sheets

ALLOCATING DOWNLINK ACKNOWLEDGEMENT RESOURCES IN WIRELESS COMMUNICATION NETWORKS

FIELD OF THE DISCLOSURE

The present disclosure relates generally to wireless communications and more particularly to allocating a downlink feedback resource, for example, a Physical Hybrid ARQ Channel (PHICH) resource, to multiple wireless terminals having different scheduling characteristics, devices and methods.

BACKGROUND

In wireless communication systems generally, a downlink (DL) resource is allocated to user terminals for receiving ACK/NACK signaling from the base station. In the Long Term Evolution (LTE) of the Third Generation Partnership Project (3GPP) Universal Mobile Telecommunications System (UMTS) wireless communication protocol, for example, it has been proposed to assign a PHICH to a MU-MIMO terminal in a non-adaptive HARQ state using a resource block (RB) that implicitly points to the assigned PHICH, wherein multiple MU-MIMO terminals are multiplexed on a common time frequency resource. It has also been proposed to assign a PHICH resource to multi-user MU-MIMO terminals from an assigned PHICH group using a 3-bit Cyclic Shift Index (CSI) to avoid ambiguous PHICH assignments between terminals multiplexed on the same time frequency resource. The 3-bit Cyclic Shift Index (CSI) is being considered for inclusion on the scheduling grant primarily for setting a cyclic shift the terminal uses for its demodulation of reference signal (RS) transmissions, especially for MU-MIMO transmissions. The cyclic shift setting guarantees orthogonality between MU-MIMO terminals multiplexed on the same uplink time frequency resource.

The various aspects, features and advantages of the disclosure will become more fully apparent to those having ordinary skill in the art upon a careful consideration of the following Detailed Description thereof with the accompanying drawings described below. The drawings may have been simplified for clarity and are not necessarily drawn to scale.

DETAILED DESCRIPTION

Figure 1:
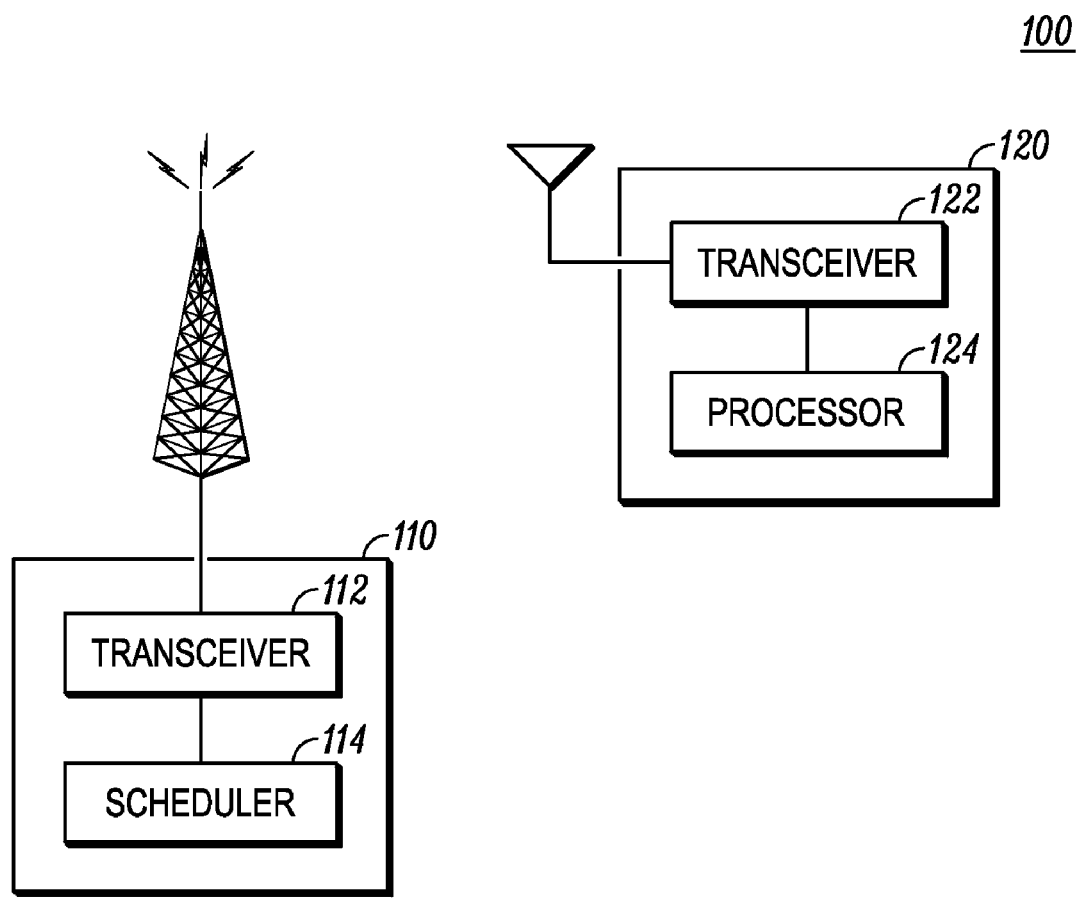
FIG. 1 is a wireless communication system.
Figure 2:
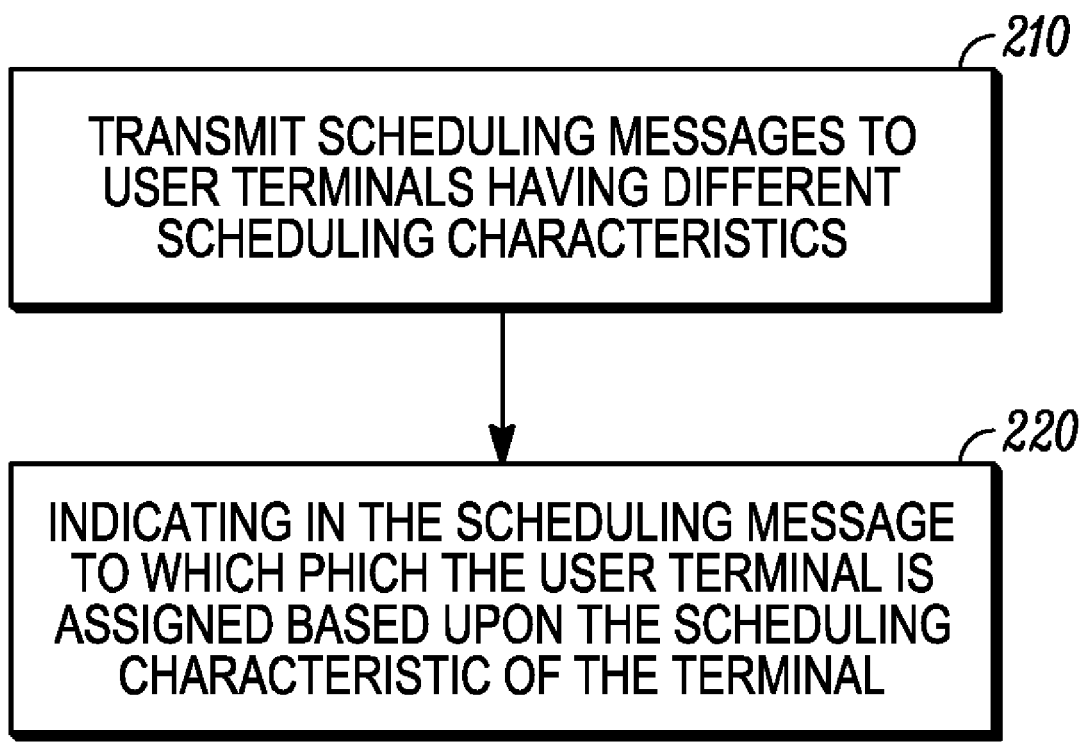
FIG. 2 is a process flow diagram.

In FIG. 1, the system 100 comprises a base station 110 that communicates wirelessly with a plurality of wireless communication terminals 120, only one of which is illustrated. The terminal may also be referred to as user equipment (UE), a user terminal, or a mobile station (MS) among other terms used in the art. The base station is typically one of several base stations coupled to a controller, the combination of which forms part of an access network. The access network is typically coupled to one or more core networks. In other embodiments, the architecture of the communication system may be different. The implementation of the present disclosure is not intended to be limited to any particular system architecture.

In FIG. 1, the base station 110 includes a transceiver 112 and a scheduling entity 114 and the terminal 120 includes a transceiver 122 and a processor 124. The base station communicates with the terminals over a downlink (DL) channel and the terminals communicate with the base station over an uplink (UL) channel. In one implementation, the system is compliant with the proposed Long Term Evolution (LTE) of the 3GPP Universal Mobile Telecommunications System (UMTS) wireless communication protocol wherein the base station transmits using an orthogonal frequency division multiple access (OFDMA) modulation scheme on the downlink and the user terminals communicate or transmit on the uplink using a single carrier-frequency division multiple access (SC-FDMA) scheme. More generally, however, the wireless communication system may implement some other open or proprietary communication protocol. The present disclosure is not intended to be limited to the implementation of any particular communication protocol.

In one implementation, the base station and terminals communicate within a frame structure wherein each frame has a specified duration, for example, 1 ms. The scheduler allocates resources to the terminals for uplink and downlink communications using a scheduling message. The terminals generally have different scheduling characteristics. For example, the user terminals may be scheduled dynamically or persistently. A dynamically scheduled terminal is allocated resources on a frame by frame basis. In other words, the terminal receives an explicit resource assignment for each frame within which a corresponding resource is assigned. In one embodiment, dynamic scheduling grants are made in a Layer-1/2 scheduling message. A persistently scheduled terminal is allocated resources in multiple frames in a single resource assignment. In one embodiment, persistent or semi-persistent scheduling grants are made in a Layer-1/2 scheduling message or a Layer-2/3 scheduling message. Other terminals that do not have persistent or semi-persistent or dynamic scheduling grants are not scheduled.

In one embodiment, each scheduling message includes a reference signal cyclic shift indicator (CSI) and a resource assignment. More generally, a reference signal indicator may be used instead of the reference signal cyclic shift indicator. The reference signal indicator may include but is not limited to indication of a base reference signal sequence, reference signal cyclic shift indicator (CSI) of the base reference signal sequence, reference signal block modulation sequence, or a combination thereof. In one embodiment the reference signal block modulation sequence are elements of an orthogonal code/sequence such as Walsh codes or Discrete Fourier Transform (DFT) codes. The elements of the reference signal block modulation sequence modulate or multiply a plurality of reference signal symbols with the frame structure. A reference signal (or pilot signal) is commonly used to enable a receiver to perform a number of critical functions, including but not limited to, the acquisition and tracking of timing and frequency synchronization, the estimation and tracking of desired channels for subsequent demodulation and decoding of the information data, the estimation and monitoring of the characteristics of other channels for handoff, interference suppression, etc. In one embodiment the reference signal indicator may indicate a reference signal hopping pattern or a position or start in the reference signal hopping pattern. More specifically, the reference signal cyclic shift indicator (CSI) may indicate a reference signal cyclic shift hopping pattern or a position (such as the first element) in the reference signal cyclic shift hopping pattern.

In embodiments where the system includes MU-MIMO terminals, the scheduling message will always include CSI. Where MU-MIMO terminals are not included, the scheduling message may not require CSI. The support of MU-MIMO is also a scheduling characteristic. In embodiments that support hopping and/or MU-MIMO, CSI will always be required in the scheduling message to determine the reference signal cyclic shift hopping set. Yet another scheduling characteristic is whether the terminal is being scheduled in an adaptive or non-adaptive fashion. In case of adaptive scheduling, the terminal receives a new scheduling grant for re-transmissions. In the case of non-adaptive scheduling the terminal does not receive an explicit scheduling grant for re-transmissions but uses the identical resource used in the previous re-transmission. The reason adaptive or non-adaptive characteristics are important here is that they determine whether CSI is available or not.

While the present disclosure is described primarily for the case of acknowledging uplink transmission from a user terminal to a base station on a downlink channel, the disclosure is also applicable to acknowledging downlink transmissions from base stations to user terminals, or even for transmissions from one base station to another base station, or from one mobile terminal to another. For example, the teachings of the present disclosure may be used for acknowledging downlink persistent or semi-persistent MU-MIMO transmissions on an uplink channel.

Figure 3:
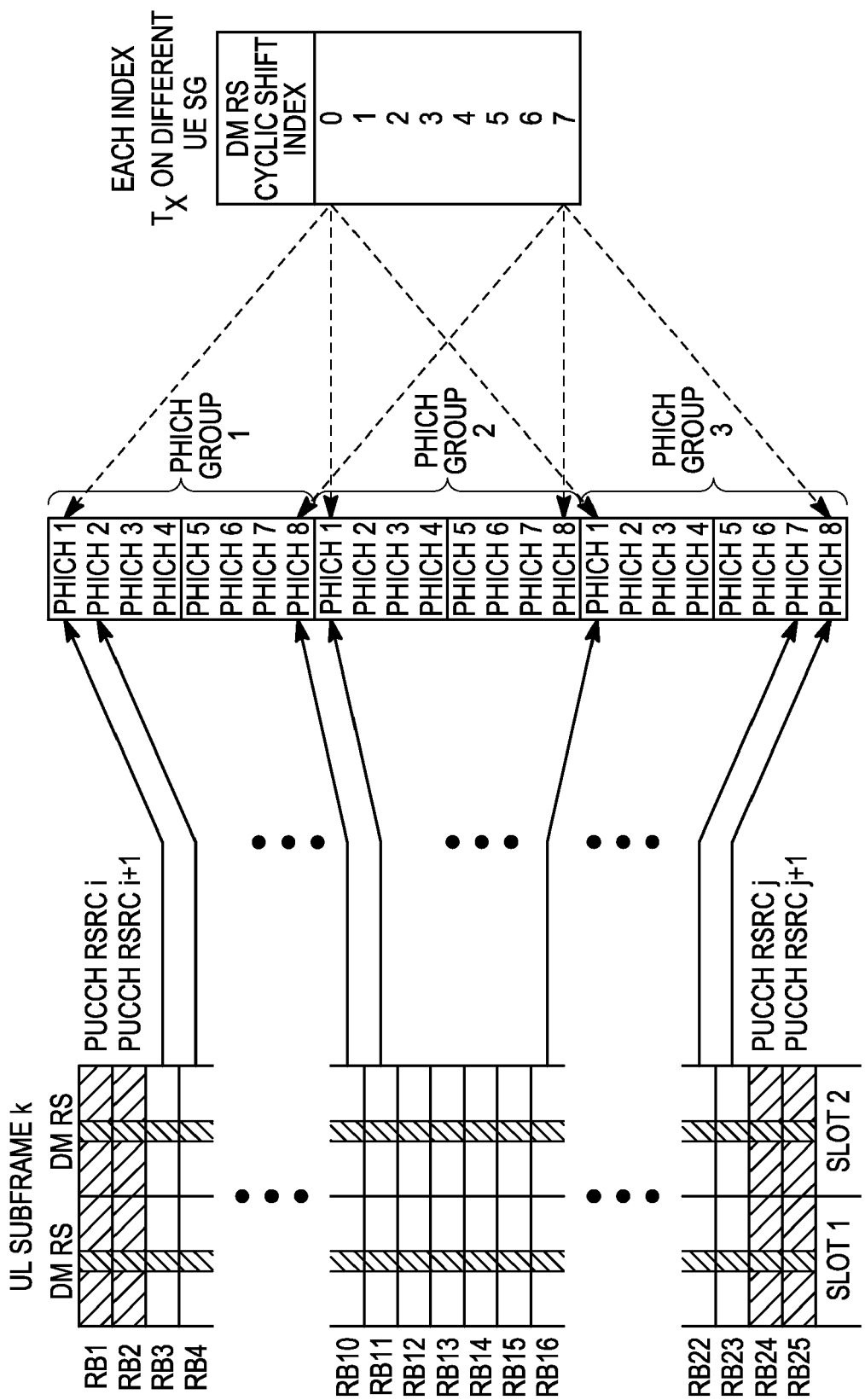
FIG. 3 is illustrates the mapping of PHICH resources to elements of a scheduling message.

The wireless communication scheduling entity generally allocates a downlink feedback resource to each user terminal in a corresponding scheduling message. In one embodiment, the downlink feedback is a physical HARQ ACK/NACK indication, transmit power control (TPC) command, control channel presence indicator, among other feedback. In one embodiment, the downlink feedback resource is a physical HARQ ACK/NACK channel (PHICH). Whether the scheduling message is a Layer-1/Layer-2 message or a Layer-3 message depends upon the scheduling characteristic of the terminal. In FIG. 3, the scheduling entity, for example, the base station 110 in FIG. 1, transmits corresponding scheduling messages to at least two wireless terminals, each wireless terminal having a different scheduling characteristic. Generally, each scheduling message indicates to which downlink acknowledgement resource the corresponding wireless terminal is assigned.

In one embodiment, the assignment of the downlink feedback resource to each wireless terminal having a first scheduling characteristic is indicated by the reference signal cyclic shift indicator in the corresponding scheduling message. In another embodiment, the assignment of the downlink feedback resource to each wireless terminal having a second scheduling characteristic is indicated by a corresponding resource assignment. Thus a wireless communication terminal, for example, the terminal 120 in FIG. 1, receiving a downlink feedback resource assignment in a scheduling message having a reference signal cyclic shift indicator and resource assignment, is configured to determine which downlink feedback resource is assigned to the wireless communication terminal using either the reference signal cyclic shift indicator or the resource assignment depending on the scheduling characteristic of the terminal.

FIG. 3 is illustrates the mapping of PHICH resources to elements of a scheduling message. According to this embodiment, the assignment of PHICH resources to dynamically scheduled terminals is indicated by the reference signal cyclic shift indicator in the corresponding scheduling message. In one implementation, the CSI is a 3-bit index that is mapped to a corresponding PHICH. In FIG. 3, the PHICH resources are divided into multiple groups of 8, wherein each CSI index maps to a particular resource in each of the three groups. In another embodiment, the reference signal cyclic shift indicator of the scheduling message may be used to indicate a cyclic shift that each wireless terminal should use for its reference symbol transmission.

In embodiments where there is an insufficient number of reference signal cyclic shift indicator indices to map directly to each PHICH resource and where multiple downlink feedback resource, e.g., PHICH, groups are formed, one portion of the reference signal cyclic shift indicator of the corresponding scheduling message transmitted to a wireless terminal may be used to identify the downlink feedback resource group to which the wireless terminal is assigned and another portion of the reference signal cyclic shift indicator may be used to identify the particular downlink feedback resource within the identified group to which the wireless terminal is assigned. In another embodiment, at least two downlink feedback resource groups are assigned to a wireless terminal. Here too, a portion of the reference signal cyclic shift indicator of the corresponding scheduling message transmitted to the wireless terminal may be used by the terminal to identify the downlink feedback resource groups to which the wireless terminal is assigned and another portion of the reference signal cyclic shift indicator of the corresponding scheduling message transmitted to the wireless terminal may be used by the terminal to identify the downlink feedback resource within the identified groups to which the wireless terminal is assigned. In another embodiment the CSI can identify fewer states than PHICHs in a PHICH group. In this case the CSI will only map to a subset of the PHICHs in the PHICH group. For example, the CSI mapping could start at the top PHICH of the PHICH group and go down or start from the bottom PHICH of the PHICH group and go up. Other possibilities include random assignments of the CSI states to the PHICHs in the PHICH group which could depend on the frame number.

In another embodiment, where a wireless terminal is assigned to at least two PHICH groups, the terminal hops between the PHICH groups based on frame number. The PHICH groups to which the terminal is assigned may be indicated by the reference signal cyclic shift indicator of the corresponding scheduling message transmitted to the wireless terminal. According to this embodiment, the terminal determines the downlink feedback resource in the identified group to which the wireless terminal is hopped using the reference signal cyclic shift indicator of the corresponding scheduling message transmitted to the wireless communication terminal. In another embodiment the assigned PHICH groups are identified by Layer 3 messaging.

In another embodiment, where a wireless terminal is assigned to at least two PHICH groups, transmit power control commands are signaled to the terminal using one of the at least two assigned downlink feedback resource groups assigned to the terminal and downlink feedbacks are signaled using another of the at least two assigned downlink feedback resource groups assigned to the terminal.

In one embodiment, one of the PHICH groups assigned to the terminal has 4 PHICH resources and the other PHICH group assigned to the terminal has 8 PHICH resources.

In another embodiment, where a wireless terminal is assigned to at least two PHICH groups wherein one group has 4 PHICH resources and the other group has 8 PHICH resources, the PHICH group to which the terminal is assigned is identified using a portion of the reference signal cyclic shift indicator of the corresponding scheduling message transmitted to the wireless terminal. In one embodiment, the terminal is assigned one PHICH group or the other based on the channel quality feedback reported by the terminal. The PHICH in the identified group to which the wireless terminal is assigned may be indicated using a portion of the CSI of the corresponding scheduling message transmitted to the wireless terminal.

In FIG. 3, the assignment of PHICH resources to persistently scheduled terminals is indicated by a corresponding resource assignment. In one embodiment, the resource block PHICH pointers can be defined to start after and before the PUCCH resources. When PUCCH resources are reconfigured, then the PHICH RB based mapping would also change. In FIG. 3, it is possible to eliminate PHICH Group 3 and have the first four PHICH of PHICH Group 1 map to RBs 3, 4, 5, 6 and last four PHICH of PHICH Group 1 map to Resource Blocks (RBs) 20, 21, 22, 23 given fewer persistently scheduled terminals. In embodiments where the CSI is not included or indicated in the scheduling message, the uppermost data resource block in the set of data resource blocks may be used to point to the PHICH assigned to the corresponding wireless terminal. In another embodiment mapping to an individual PHICH in a single PHICH group can be determined by both CSI and a resource assignment.

In one embodiment, the scheduler assigns at least two MU-MIMO wireless terminals a common resource assignment including a set of data resource blocks. In this embodiment, the reference signal cyclic shift indicator of the scheduling message may be used to identify which data resource block in the set of data resource blocks that points to the downlink feedback resource assigned to the corresponding MU-MIMO wireless terminal. Thus, upon receipt of the scheduling message, a persistently scheduled MU-MIMO terminal that is assigned a resource including a set of data resource blocks uses the reference signal cyclic shift indicator to identify which data resource block in the set of data resource blocks that points to the downlink feedback resource assigned to the terminal.

In another embodiment, two wireless terminals are assigned at least two common resource block pairs, wherein one of the common resource block pairs is an uppermost resource block pair in a carrier frequency band and another of the common resource block pairs is a lowermost resource block pair in the carrier frequency band. According to this scheduling scheme, the first wireless terminal is assigned to a first resource block in the uppermost common resource block pair and the second wireless terminal is assigned a first resource block in the lowermost common resource block pair. The downlink feedback resource assignment to the first wireless terminal is indicated with the first resource block of the uppermost resource block pair and the downlink feedback resource assignment to the second wireless terminal is indicated using first resource block of the lowermost resource block pair.

Thus according to this embodiment, a wireless communication terminal is assigned to a first resource block of one of two resource block pairs and also to a second resource block in the one of two resource block pairs, one of the resource block pairs is an uppermost resource block pair in a carrier frequency band and another of the resource block pairs is a lowermost resource block pair in the carrier frequency band. The terminal may thus determine its assigned downlink feedback resource using the uppermost resource block pair or the lowermost resource block pair depending on whether the wireless communication terminal is assigned the first resource block in the uppermost resource block pair or the first resource block in the lowermost resource block pair.

While the present disclosure and the best modes thereof have been described in a manner establishing possession and enabling those of ordinary skill to make and use the same, it will be understood and appreciated that there are equivalents to the exemplary embodiments disclosed herein and that modifications and variations may be made thereto without departing from the scope and spirit of the inventions, which are to be limited not by the exemplary embodiments but by the appended claims.

What is claimed is:

1. A method in a wireless communication scheduling entity for allocating a downlink feedback resource to multiple wireless terminals having different scheduling characteristics, the method comprising:
   transmitting corresponding scheduling messages to first and second wireless terminals, the first and second wireless terminals having a different scheduling characteristic,
   each scheduling message includes a reference signal cyclic shift indicator and a resource assignment,
   the assignment of the downlink feedback resource to the first wireless terminal having a first scheduling characteristic indicated by the reference signal cyclic shift indicator in the corresponding scheduling message, and
   the assignment of the downlink feedback resource to the second wireless terminal having a second scheduling characteristic indicated by a corresponding resource assignment;
   indicating a cyclic shift, that the first wireless terminal should use for its reference signal transmission, using the reference signal cyclic shift indicator of the corresponding scheduling message.

2. The method of claim 1,
   the first and second wireless terminals having a common resource assignment including a set of data resource blocks,
   each of the first and second wireless terminals using a corresponding reference signal cyclic shift indicator to identify a corresponding data resource block in the set of data resource blocks, the corresponding data resource block pointing to the downlink feedback resource assigned to the corresponding wireless terminal.

3. The method of claim 1,
   first and second wireless terminals are assigned at least two common resource block pairs, one of the common resource block pairs is an uppermost resource block pair in a carrier frequency band and another of the common resource block pairs is a lowermost resource block pair in the carrier frequency band,
   the first wireless terminal is assigned a first resource block in the uppermost common resource block pair and the second wireless terminal is assigned a first resource block in the lowermost common resource block pair,
   indicating the downlink feedback resource assignment to the first wireless terminal with the first resource block of the uppermost resource block pair and indicating the downlink feedback resource assignment to the second wireless terminal with the first resource block of the lowermost resource block pair.

4. The method of claim 1,
   forming at least two downlink feedback resource groups,
   assigning the first wireless terminal to at least two downlink feedback resource groups,
   identifying the downlink feedback resource groups to which the first wireless terminal is assigned using a portion of the reference signal cyclic shift indicator of the corresponding scheduling message transmitted to the first wireless terminal,
   identifying the downlink feedback resource in the identified groups to which the first wireless terminal is assigned using another portion of the reference signal cyclic shift indicator of the corresponding scheduling message transmitted to the first wireless terminal.

5. The method of claim 1,
forming at least two downlink feedback resource groups,
assigning the first wireless terminal to at least two downlink feedback resource groups,
using one of the at least two assigned downlink feedback resource groups to signal transmit power control commands and using another of the at least two assigned downlink feedback resource groups to signal downlink feedback.

6. The method of claim 1,
assigning downlink feedback resources into multiple groups,
assigning the first wireless terminal to at least two downlink feedback resource groups,
hopping between the at least two downlink feedback resource groups based on frame number,
indicating the downlink feedback resource in the feedback resource group in which the first wireless terminal is hopped using the reference signal cyclic shift indicator.

7. The method of claim 1,
the second scheduling characteristic requires assignment of resources in multiple frames to the second wireless terminal using a single scheduling message,
indicating the downlink feedback resource assignment to the second wireless terminal having the second scheduling characteristic using the resource assignment.

8. A method in a wireless communication terminal for receiving a downlink feedback resource assignment, the method comprising:
receiving, at the wireless communication terminal, a scheduling message,
the scheduling message including a reference signal cyclic shift indicator and resource assignment,
determining which downlink feedback resource is assigned to the wireless communication terminal using the reference signal cyclic shift indicator and the resource assignment; and
determining a cyclic shift, that the wireless communication terminal should use for reference signal transmission, using the reference signal cyclic shift indicator of the scheduling message.

9. The method of claim 8,
the wireless communication terminal is assigned a resource including a set of data resource blocks,
using the reference signal cyclic shift indicator to identify which data resource block, in the set of data resource blocks, that points to the downlink feedback resource assigned to the wireless communication terminal.

10. The method of claim 8,
the wireless communication terminal is assigned to a first resource block of one of two resource block pairs and also to a second resource block of the other of the two resource block pairs, one of the resource block pairs is an uppermost resource block pair in a carrier frequency band and the other of the two resource block pairs is a lowermost resource block pair in the carrier frequency band,
determining the downlink feedback resource assigned to the wireless communication terminal using the either the first resource block or the second resource block assigned to the wireless communication terminal.

11. The method of claim 8,
determining the downlink feedback resource group to which the wireless communication terminal is assigned using a portion of the reference signal cyclic shift indicator of the scheduling message,
determining the downlink feedback resource in the determined group to which the wireless communication terminal is assigned using another portion of the reference signal cyclic shift indicator.

12. The method of claim 8,
hopping between at least two downlink feedback resource groups based on frame number,
determining the downlink feedback resource in the group to which the wireless terminal is hopped using the reference signal cyclic shift indicator.

13. The method of claim 8, transmitting a reference signal using the determined cyclic shift.

14. A method in a wireless communication terminal for receiving a downlink feedback resource assignment, the method comprising:
receiving, at the wireless communication terminal, a scheduling message,
the scheduling message including a reference signal cyclic shift indicator and resource assignment,
determining which downlink feedback resource is assigned to the wireless communication terminal using one or both the reference signal cyclic shift indicator and the resource assignment depending on a scheduling characteristic of the wireless communication terminal;
determining a cyclic shift, that the wireless communication terminal should use for reference signal transmission, using the reference signal cyclic shift indicator of the scheduling message when the downlink feedback resource is determined using at least the reference signal cyclic shift indicator.

15. The method of claim 1, the first scheduling characteristic requires assignment of a resource in a single frame to the first wireless terminal using a corresponding scheduling message.

16. The method of claim 8, determining the downlink feedback resource assignment to the wireless communication terminal using the reference signal cyclic shift indicator and the resource assignment when a resource in a single frame is assigned to the wireless communication terminal using a single scheduling message.

17. The method of claim 14, determining the downlink feedback resource assignment to the wireless communication terminal using the reference signal cyclic shift indicator when a resource in a single frame is assigned to the wireless terminal using a corresponding scheduling message.

18. The method of claim 14, determining the downlink feedback resource assignment to the wireless communication terminal using the resource assignment when resources in multiple frames are assigned to the wireless communication terminal using a single scheduling message.

* * * * *